(12) United States Patent
Ruschin

(10) Patent No.: US 6,552,864 B1
(45) Date of Patent: Apr. 22, 2003

(54) BEAM GENERATION METHOD AND SYSTEM

(75) Inventor: Shlomo Ruschin, Herzlia (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 09/512,878

(22) Filed: Feb. 25, 2000

Related U.S. Application Data (63) Continuation-in-part of application No. 09/024,513, filed on Feb. 17, 1998, now abandoned.

(51) Int. Cl.[7] .......................... G02B 27/00; G02B 5/00; G02B 7/00
(52) U.S. Cl. .............. 359/894; 359/558; 359/562; 250/493.1; 250/503.1; 369/112.01; 369/112.23
(58) Field of Search .................. 359/894, 558, 359/577, 562; 369/112.23, 112.01; 250/493.1, 503.1

(56) References Cited

U.S. PATENT DOCUMENTS

| | | | |
|---|---|---|---|
| 4,852,973 A | 8/1989 | Durnin et al. | |
| 4,887,885 A | * 12/1989 | Durwin | 372/66 |
| 5,349,592 A | 9/1994 | Ando | |
| 5,370,643 A | * 12/1994 | Krivoshlykov et al. | 385/124 |
| 5,497,359 A | 3/1996 | Mamin et al. | |
| 6,243,350 B1 | * 6/2001 | Knight | 369/126 |

* cited by examiner

Primary Examiner—Audrey Chang
Assistant Examiner—Leo Boutsikaris
(74) Attorney, Agent, or Firm—Mark M. Friedman (57) ABSTRACT

A method and a system for generating a beam of radiation in a target plane located in a near-filed region of a radiation emitting means. A beam of radiation having a substantially plane wavefront is emitted. A normal Bessel beam, having its transverse profile substantially in the form of a Bessel function, is produced from said emitted beam of radiation. The normal Bessel beam is produced in a first medium of a refraction index $n_1$ and is directed towards the target plane located in a second medium having a refraction index $n_2$, such that $n_2 < n_1$. Passage of the normal Bessel beam from the first medium into the second medium results in the generation of an evanescent Bessel beam of radiation propagating in the second medium. The evanescent Bessel beam has a center lobe significantly smaller in size than the wavelength of radiation in the second medium, and basically retains its shape in the second medium.

22 Claims, 9 Drawing Sheets

BEAM GENERATION METHOD AND SYSTEM

This is a Continuation-in-part of application Ser. No. 09/024,513, filed Feb. 17, 1998 now abandoned.

FIELD OF THE INVENTION

The present invention is in the field of beam generation techniques, particularly useful in near-field applications such as, for example, high resolution scanning for optical data storage, inspection, recording, microscopy, etc.

BACKGROUND OF THE INVENTION

There is a great variety of light scanning systems, typically comprising a light source for generating a light beam of a certain wavelength and light directing means for directing the light beam onto the object. A common goal of such systems consists of increasing the system's resolution. It is known that a resolution depends on the diameter of a light beam striking the object, namely the less the diameter of the beam, the higher the resolution of the system. Laws of electromagnetism, governing the propagation of light, state that a propagating light wave cannot be focused to a spot of a size significantly smaller than the light wavelength.

One approach to overcome this impediment is based on broader subject known as "near field optics". According to this approach, a point-like light source, having dimensions smaller than the light wavelength, is typically generated by means of either defining small apertures on opaque screens, or passing the light through point-like tips of sub-wavelength dimensions. However, these means have an inherent property consisting of that the spot-size provided by light emerging from a point-like source expands rapidly away from the source. As a result, high optical resolution can be achieved solely at very close proximity of the source. This is a serious impediment common to all known methods in near field optics.

Systems for generating propagating optical beams that do not expand the size of a central lobe in the transverse profile of the beam while propagating have been developed and disclosed, for example, in U.S. Pat. Nos. 4,852,973 and 4,887,885. Such beams are identified as "non-diffracting beams" or Bessel beams. The technique disclosed in these patents provides for generating a traveling wave beam substantially unaffected by diffractive spreading, namely a beam having a transverse Bessel function profile, such that its effective spatial width is not smaller than several wavelengths. This condition is inherent to the propagating character of the disclosed solutions of the optical fields and methods of generating them.

Figure 1:
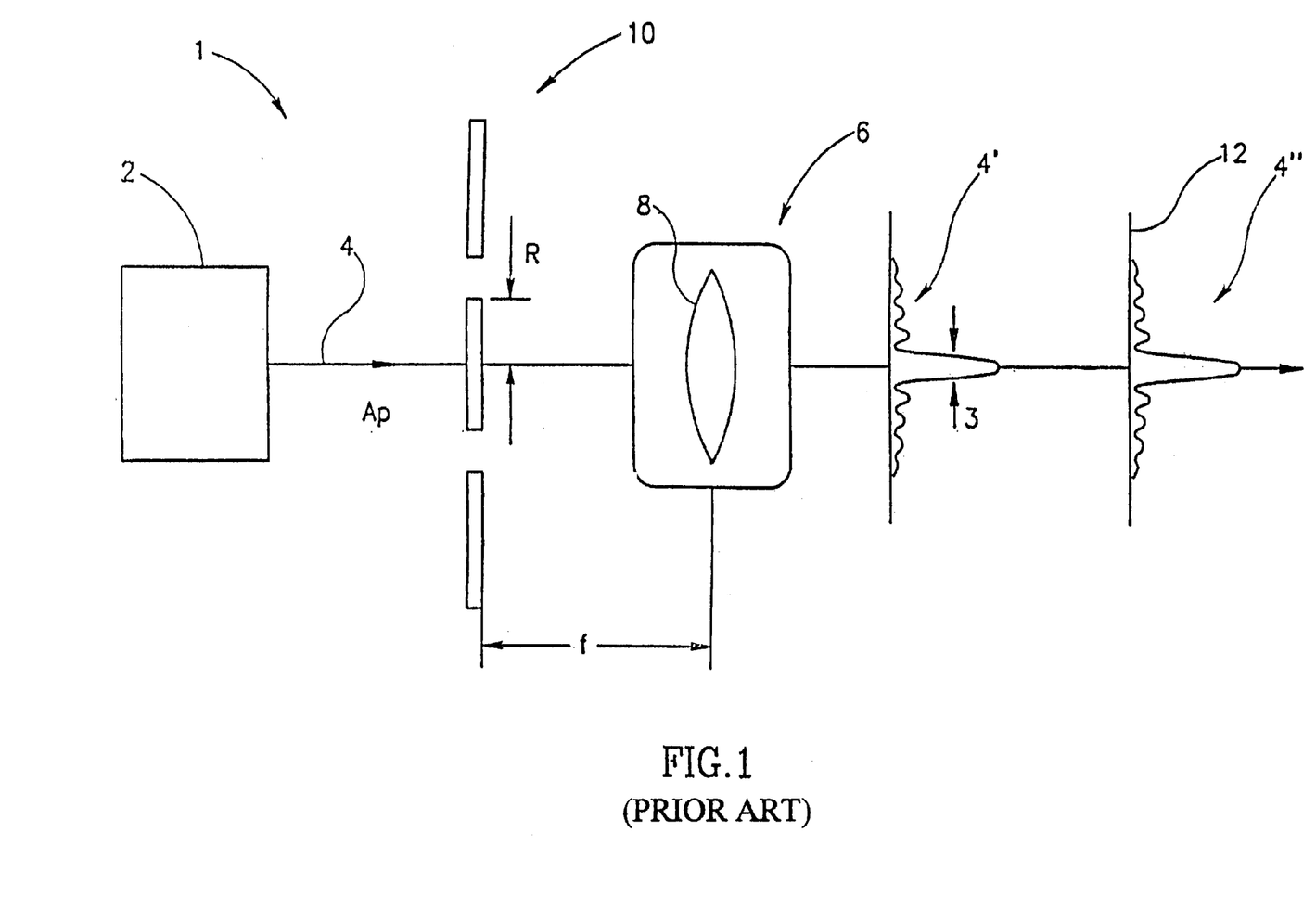
FIG. 1 is a schematic block diagram illustrating the main components of a conventional system for producing a Bessel beam of the propagating type.

As illustrated in FIG. 1, a system of the kind, generally designated 1, comprises a light source 2 for emitting a light beam 4 and a collimating and focusing arrangement, generally at 6, which typically includes a lens 8 or plurality of such lenses (not shown). A circular annular source 10 of the beam 4, defining the radius R of a circular slit in screen, is located in the back focal plane of the lens 8. As shown, the passage of the beam 4 through such a circular annular source 10 forms a narrow beam 4' whose profile across the circular annular source 10 is in the form of a Bessel function. The beam 4' propagates along an axis $A_p$ and impinges onto an object 12 (constituting a target plane), while substantially retaining its form at 4". A sharp central spot size s is related to the radius R of the circular slit in the screen, a focal length f of the lens 8 and the wavelength $\lambda$ of the light beam as follows:

$$s = \frac{3}{4} \cdot \frac{\lambda f}{R}$$

Thus, the system 1 represents a "diffraction free arrangement" which enables to generate an axially symmetric, non-diffraction, non-evanescent field in the form of a known zero-order Bessel function of the first kind.

Figure 2A:
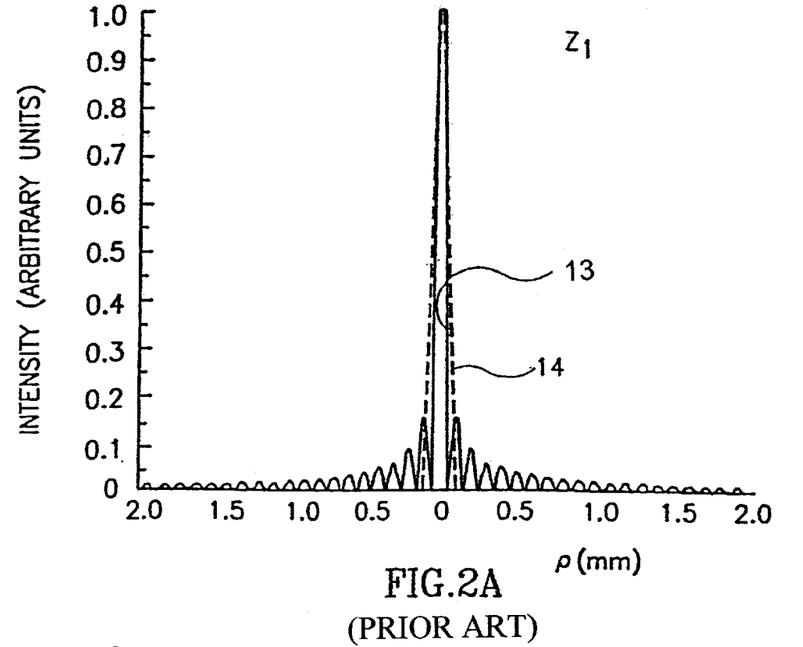
FIGS. 2a and 2b illustrate graphically the intensity distributions of a normal Bessel and Gaussian beams at two different distances of propagation respectively.
Figure 2B:
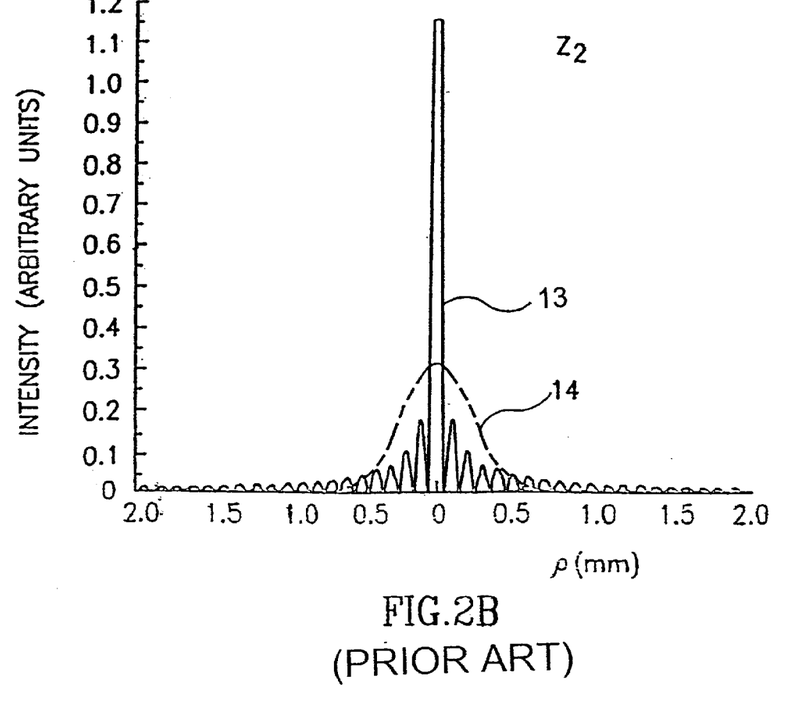

Turning now to FIGS. 2a and 2b, there are illustrated the intensity distributions of the zero-order Bessel beam $J_0$ (solid line 13) in comparison to a Gaussian beam (dotted line 14) at two different distances $z_1$ and $z_2$ of propagation, respectively. FIG. 2a shows the position of $z_1=0$, that is an initial plane where the beams are formed, while FIG. 2b shows the position after propagating a distance $z_2=50$ cm. It is evident that the Bessel beam, while propagating along the axis $A_p$, substantially retains its transverse shape at a central part along the axis of propagation $A_p$. It should be specifically noted that this method, as many other conventional methods, relates to propagating beams and distances much larger than the size of the aperture.

Another solution for producing a Bessel beam is disclosed in U.S. Pat. No. 5,349,592. According to this technique, a three-portion apodizer is used aimed at reducing the sidelobe intensity of a light beam and obtaining a relatively high center peak intensity ratio. This can facilitate data reading in a high recording density data carrier. The apodizer changes characteristics of the wavefront of part of the light beam, so as to split the wavefront and to change the beam spot size on a target plane (image bearing member). This is implemented by deviating the phases of light beam components.

U.S. Pat. No. 5,497,359 discloses a system aimed at reducing the diameter of a scanning (reading) beam. The system relates to an optical disk data storage, typically comprising a light source for emitting a light beam and light directing means. The operation of the system is based on the transition of tightly focused beams between two dielectric interfaces. To this end, the light directing means comprises a super-hemispherical solid immersion lens (SIL) which is in the form of an air-bearing slider (ABS) having a lens section located on its back side opposite the side with the ABS. The slider and the lens section are made of the same transparent material having the same refraction index n. According to a so-called "evanescent field coupling" phenomenon, the appearance of an evanescent field associated with light internally reflected within the SIL is provided. An evanescent mode is a wave-guide propagation mode which is known per se and therefore need not be more specifically described, except to note that in this mode the amplitude of a wave diminishes rapidly along the direction of its propagation, but the phase does not change.

Generally speaking, the technique disclosed in the above patent utilizes the effect of coupling evanescent fields of high angle light beams to a recording medium (optical disc), and is aimed at reducing the spot size on a target plane (optical disc). Actually, this technique improves the known SIL-based recording technique, by coupling those rays, which are internally reflected at the base of the SIL, to the optical disc via their evanescent field. This technique deals with the coupling of both propagating evanescent and non-evanescent parts of incoming beams resulting in the undesirable spreading of the spot size with the beam propagation. Here, however, beams having planar wavefront are used, and the target plane is placed less than a wavelength distance from the base of the SIL. The need for such a small distance between the SIL and the target plane is associated with unavoidable beam spreading with the increase of this distance, due to the fact that both evanescent and non-evanescent components are coupled out of the arrangement.

Thus, a common unavoidable condition of the above configuration is again a very small distance (less than 0.25 wavelengths) between the object and the light directing means, i.e. the aperture and slider, respectively. This is owing to the following undesirable effects:

(1) a decaying character of the evanescent components of a field generated by the aperture; and (2) a rapidly expanding property of a remaining field, which causes the spot size of a transmitted field to increase many times within a distance equivalent of a few aperture sizes.

If the fast signal decay problem may be eliminated by employing either a stronger light source or more sensitive detection means, neither of these means will help to overcome the rapid expansion related problem.

SUMMARY OF THE INVENTION

It is an object of the present invention to provide a novel method and system for generating a beam of radiation, particularly such a beam that has acenter-lobe size substantially reduced as compared to its wave-length and substantially stable profile within a desired distance from a radiation emitting means.

There is provided, according to one aspect of the invention, a method for generating a beam of radiation in a target plane located in a near-filed region of a radiation emitting means and at a desired distance from said radiation emitting means, the method comprising the steps of:

a) emitting a beam of radiation having substantially planar wavefront;

b) producing from said emitted beam of radiation a normal Bessel beam, having its transverse profile substantially in the form of a Bessel function, propagating through a first medium of a refraction index $n_j$;

c) directing the normal Bessel beam from said first medium onto said target plane located in a second medium having a refraction index $n_2$, such that $n_2<n_1$, thereby generating an evanescent Bessel beam of radiation propagating in the second medium, said evanescent Bessel beam having a substantially stable transverse profile along a direction of beam propagation and a reduced central lobe size, as compared to a wave-length of radiation in the second medium, within said desired distance.

The term "evanescent Bessel beam" (EBB) used herewith signifies a beam whose shape is retained in all the electromagnetic vector components and amplitude changes in accordance with boundary conditions of the electromagnetic field. In other words, the EBB beam possesses the features of both the normal Bessel beam and evanescent mode.

Thus, the idea of the present invention consists in extension of the concept of "non-difracting" Bessel beams into the near field optics by means of generating EBBs. The normal Bessel beam may be produced by any known means, for example, by placing a circular annular source of the beam in a focal plane of a focusing optics.

The normal Bessel beam may be produced in the first medium, and directed through the interface between the first and the second media to produce the EBB. Preferably, the first medium comprises a lens arrangements a circular annular source accommodated proximate the lens arrangement, and a slab extending in a direction of propagation of the beam of radiation towards the target plane. To this end, the circular annular source is either attached to or located proximate the rear surface of the slab (with respect to the direction of beam propagation), while its front surface is located in a focal plane of the lens arrangement and represents the interface between the first and second mediums.

Alternatively, the normal Bessel beam may be produced in the first medium, and directed through a third medium having a refraction index $n_3$, such that $n_3 \geq n_1 > n_2$, and being located contiguous to the first medium downstream thereof relative to the direction of propagation of the emitted beam towards the second medium. In other words, the third medium is interposed between the first and second media, wherein the refraction index of the second medium is less than the refraction index of each of the first and third media. In this case, the third medium is in the form of a cylindrical waveguide attached to the front surface of the slab, a front end of the cylindrical waveguide representing the interface between the third and second media. A cylindrical waveguide, made from a dielectric material with metallic boundaries, is known as supporting and allowing the propagation therethrough of modes of shape of the kind of Bessel functions. Dielectric cylindrical waveguides are also known as optical fibers, supporting very high-order modes having an essentially Bessel-function type shape. This technique enables to separate between the creation of the normal Bessel beam and the delivery of the EBB. Thus, this technique provides a method for creating and propagating high-order modes of Bessel function shape in optical fibers and, in general, in substantially cylindrical waveguides. These modes will transform into Evanescent Bessel beams once a dielectric waveguide is terminated in a plane perpendicular to the axis of the cylindrical waveguide provided this plane acts as an interface with a medium with lower refractive index, as compared to that of the waveguide and the first medium.

According to another aspect of the present invention there is provided a system for generating a beam of radiation in a target plane located in a near-filed region of a means for emitting a beam of radiation of a substantially planar wavefront and at a desired distance from said means, the system comprising: an optical arrangement accommodated in an optical path of the emitted beam for producing therefrom a normal Bessel beam, having its transverse profile in the form of a Bessel function, propagating in a first optical medium of refraction index $n_1$ and allowing the passage of said normal Bessel beam from said first optical medium into a second optical medium having a refraction index $n_2$ such that $n_2<n_1$, the target plane being located in said second medium, wherein said passage generates an evanescent Bessel beam propagating in the second medium, said evanescent Bessel beam having a substantially stable transverse profile along a direction of beam propagation and a reduced central lobe size, as compared to a wavelength of radiation in the second medium, within said desired distance.

Thus, the present invention provides a technique of generating an evanescent Bessel beam (EBB) by utilizing the creation of a normal Bessel beam from an emitted beam of a planar wavefront, and application of the evanescent mode of beam propagation to the normal Bessel beam. Such an EBB has the following advantageous features: significantly reduced diameter as compared to that of the emitted beam; a central lobe significantly smaller in size than the wavelength of radiation in the medium where the EBB is generated (second medium); and retained tight focus profile along the direction of beam propagation within the desired distance. This desired distance is relatively large for near-field applications, e.g., up to several wavelengths, and can be even more increased by utilizing the third medium interposed between the first and second media, provided the refraction index of the second medium is less than the refraction index of each of the first and third media.

BRIEF DESCRIPTION OF THE DRAWINGS

In order to understand the invention and to see how the same may be carried out in practice, there will now be described a preferred embodiments by way of non-limiting example, with reference to the accompanying drawings, in which.

DETAILED DESCRIPTION OF PREFERRED EMBODIMENTS

FIG. 1 illustrates a conventional system for producing a normal Bessel beam by means of generating an axially symmetric, non-diffraction, non-evanescent field in the form of a known zero-order Bessel function of the first kind. FIGS. 2a and 2b illustrate the intensity distributions of Bessel and Gaussian beams at, respectively, two different distances of propagation.

It is important to note that zero-order Bessel beams (the beam 4' in the example of FIG. 1), in spite of being a fill solution of the wave equation on which the above disclosure is based, do not provide by themselves a solution of Maxwell's equations. All the previously known versions of solutions based on the Bessel beams are of a propagating type, that is:

$$U(r,z) \propto J_{an}\cdot(\alpha r)\exp(-i\beta z) \quad (1)$$

wherein $J_{an}$ is some kind of Bessel function, and parameters $\alpha$ and $\beta$ are such as to satisfy the following conditions:

$$\alpha^2 < n^2 \cdot k_0^2 \quad (2)$$

$$\alpha^2 + \beta^2 = n^2 \cdot k_0^2 \quad (3)$$

wherein n is a refractive index of a medium where the beam propagates. The above relation (2) relates to the real values of $\beta$ i.e. non-evanescent mode. As for the case of the evanescent mode, this inequality is reversed:

$$\alpha^2 > n^2 \cdot k_0^2 \quad (4)$$

and, therefore the electromagnetic solutions are based on functions of the following type:

$$U_n(r,\phi,z) = \exp(i\phi n) J_n(\alpha r)\exp(-\beta'z) \quad (5)$$

wherein $(r,\phi,z)$ are cylindrical coordinates defined in the usual way and:

$$\beta' = \sqrt{(\alpha^2 - n^2 \cdot k_0^2)} \quad (6)$$

These functions are still valid solutions of the general wave equation.

Figure 3:
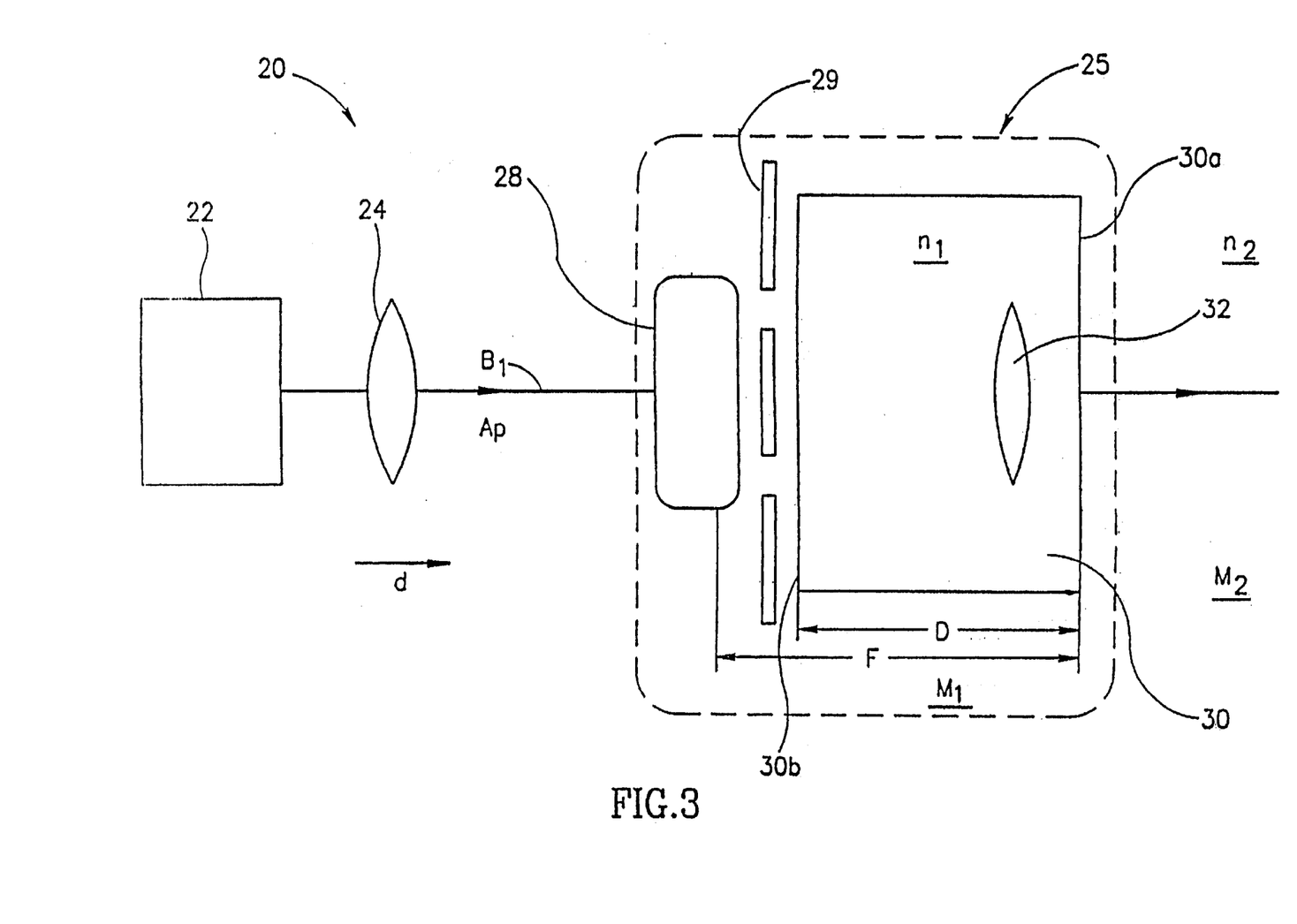
FIG. 3 is a block diagram of the main components of a beam generation system according to one embodiment of the invention.

Reference is made to FIG. 3 illustrating a system, generally designated 20, constructed and operated according to the main principles of the present invention for producing an EBB. The system 20 comprises a light source 22 followed by a collimating lens 24 for generating a collimated beam $B_1$ of a plane wavefront. Further provided is an assembly, generally designated 25, accommodated in the optical path of the beam $B_1$. The assembly 25 includes a lens arrangement 28, a circular slit 29 and a slab 30 having a thickness D defined by its opposite surfaces 30a and 30b. The circular slit 29 is placed preferably immediately after the lens 28 and may be either attached to or located proximate the rear surface 30b. The constructional parts of the assembly 25, as well as the space therebetween, if any, are formed of an optically transparent material having a refraction index $n_1$. In other words, the assembly 25 constitutes a first medium, generally at $M_1$, with the refraction index $n_1$. The focal length F of the lens 28 in the medium $M_1$ is substantially equal to the slab thickness D. Generally, the construction is such that the front surface 30a of the slab 30 is located in a front focal plane of the lens 28. The slab 30 at its side 30a is surrounded by a medium $M_2$ having a refraction index $n_2$, such that:

Thus, the front surface 30a represents an interface between the mediums $M_1$ and $M_2$ with, respectively, relatively high and low refraction indices $n_1$ and $n_2$.

Figure 4:
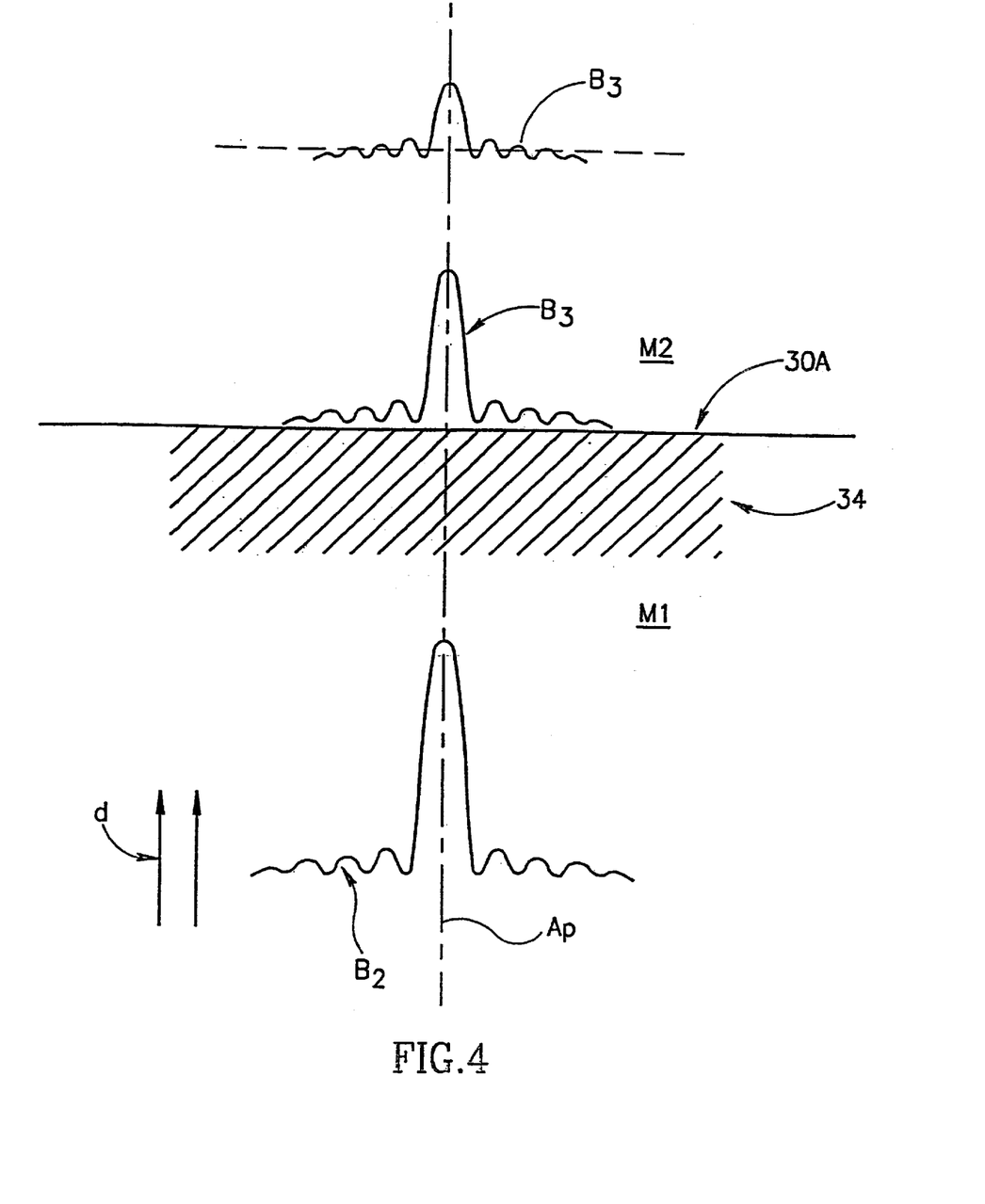
FIG. 4 is a schematic illustration of the main principles of operation of the system of FIG. 3.

The system 20 operates in the following manner. The collimated beam $B_1$ of a plane wavefront is generated in air by standard optical means (the light source 22 and lens 24). The beam $B_1$, while propagating in a direction d, passes through the lens 28, which transforms the wavefront of the beam $B_1$ from the plane into an approximately spherical. A Bessel beam $B_2$ is then generated in the medium $M_1$ by the passage of the beam $B_1$ of a spherical wavefront through the circular slit 29 as described above with reference to FIG. 1. According to known transforming properties of lens systems, at the focal plane located at the interface 30a, a pattern will be generated proportional to the Fourier Transform of the field at the plane 30b. For an annular shape, at the plane 30b the Fourier Transform is approximately given at the center portion by a Bessel function of ordinary type and zero-order $J_0$. As more specifically illustrated in FIG. 4, this ordinary Bessel beam $B_2$ further propagates in the direction d along a propagating axis $A_p$; and passes through the interface 30a being thereby transformed into an Evanescent Bessel beam $B_3$ propagating in the medium $M_2$ (provided the above conditions (4) and (7) are satisfied). The beam $B_3$ retains its shape in all the electromagnetic vector components and changes an amplitude according to the known boundary conditions of an electromagnetic field.

Turning back to FIG. 3, a lens 32 or other beam-converging arrangement is placed close to the interface 30a inside the slab 30, i.e. within the medium $M_1$; so as to compensate for a curvature existing in the beam $B_2$ and generate back a plane wavefront. This curvature elimination may not be always essential for functioning of the system 20 and, therefore, the provision of the lens 32 is optional.

In order to demonstrate that the evanescent beam is indeed created, when the original beam's parameters fulfill a definite inequality, reflection and transmission laws for the vectorial Bessel beams incident on an interface plane between two semi-infinite media of different dielectric indices will now be developed. These laws are at some extent parallel to Fressnel's laws for the plane waves. There exist various possibilities of defining vectorial beam solutions to Maxwell's equations, in which each of the components of the electromagnetic field is expressed in terms of Bessel functions. Each component has a 'non-diffractive' characteristic of retaining the transversal shape while propagating. Only two types of vector solutions, that are in some sense complementary to each other, will be considered.

For TM waves, or so-called "radially polarized beams", the components are explicitly given by:ε

$$E_r = i\beta J_1(\alpha r) e^{-i\beta z} \quad (8)$$

$$H_r = 0$$

$$E_\phi = 0$$

$$H_\phi = i\delta \frac{\omega}{c} J_1(\alpha r) e^{-i\beta z}$$

$$E_z = \alpha J_0(\alpha r) e^{-i\beta z}$$

$$H_z = 0$$

For TE waves, or "azimuthaly polarized beams", the components are given by:

$$E_\phi = -J_1(\alpha r) e^{-i\beta z}$$

$$H_\phi = 0$$

$$E_z = 0 \quad (9)$$

$$H_z = -\frac{i\alpha}{\mu k_0} J_0(\alpha r) e^{-i\beta z}$$

$$E_\phi = -J_1(\alpha r) e^{-i\beta z}$$

$$H_\phi = 0$$

In order to facilitate understanding, the following limitations should preferably be assumed:
(1) the normal incidence only, since an oblique incidence will break the axial symmetry:
(2) the lowest order Bessel modes as expressed in the equations (8) and (9), since that mode, which posseses an azimuthal cylindrical symmetry, is more applicable in non-astigmatic optical systems.

It is appreciated, although not specifically shown, that, if a vectorial Bessel beam propagating in a first medium of a refraction index $n_1$ with unit amplitude impinges normally onto the interface plane between the first and second mediums, reflected and transmitted beams having amplitudes $A_r$ and $A_t$, respectively, are generated. The conservation of a transversal momentum for these beams will result in the following:

$$\alpha^r = \alpha^t = \alpha^i = \alpha \quad (10)$$

$$-\beta^r = \beta^i = \sqrt{\left(\frac{\omega_0^2}{c^2} n_1^2 - \alpha^2\right)} \quad (11)$$

$$\beta^t = \sqrt{\left(\frac{\omega_0^2}{c^2} n_2^2 - \alpha^2\right)} \quad (12)$$

wherein all quantities are defined in terms of the transversal wavenumber of an original beam α, and the refractive indices of the media $n_1$ and $n_2$; i, r and t apply for incident, reflected and transmitted beams, respectively. The condition of generation of the evanescent transmitted Bessel beam in the second medium $M_2$ is naturally $\beta_t^2 < 0$, or in terms of the parameter of the original incident beam:

$$\beta_i^2 < (n_1^2 - n_2^2) \frac{\omega_0^2}{c^2} \quad (13)$$

This equation delimits a so-called "critical condition" when the inequality sign is replaced by equality. Such a condition is parallel to the critical angle in the total internal reflection of plane waves.

The transmission and reflection coefficients $A_r$ and $A_t$ are then calculated by equating the transversal components of the fields ($H_r, H_\phi, E_r, E_\phi$). The results for the TM beams are as follows:

$$A_r = \frac{n_2^2 \beta^i - n_1^2 \beta^t}{n_2^2 \beta^i + n_2^2 \beta^t} \quad (14)$$

$$A_t = \frac{2\beta^i n_1^2}{n_2^2 \beta^i + n_1^2 \beta^t} \quad (15)$$

Similarly, for the TE beam we have:

$$A_r = \frac{\beta^i - \beta^t}{\beta^i + \beta^t} \quad (16)$$

$$A_t = \frac{2\beta_i}{\beta^i + \beta^t} \quad (17)$$

The equations (14)–(17) are valid for the cases of $\beta_{1,2}$ being both real or imaginary.

Figure 5:
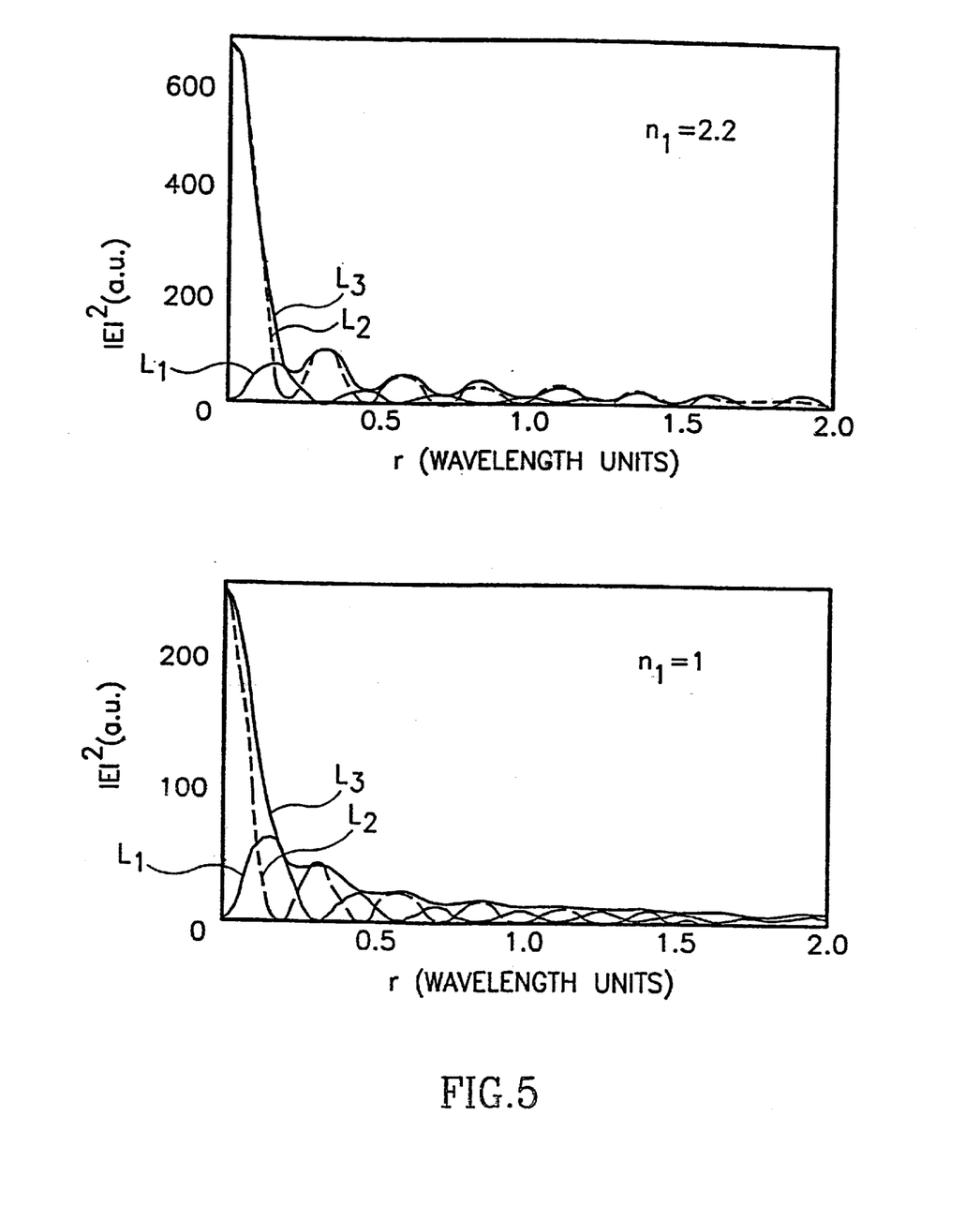
FIG. 5 is a graphic illustration of an example of the transmission of an incident normal TM Bessel beam.

Referring to FIG. 5, there is illustrated an example of the transmission of an incident normal TM Bessel beam from a medium of a refraction index $n_1=2.2$ to vacuum ($n_2=1$), which incident beam has the following parameters:

$$\alpha = \alpha^i_1 = 1.9 k_0;\ \beta = \beta^i_1 = 1.1 k_0$$

Dotted line $L_1$, dashed line $L_2$ and solid line $L_3$ denote the distributions of, respectively, transversal, longitudinal and total parts of an electrical energy.

Figure 6:
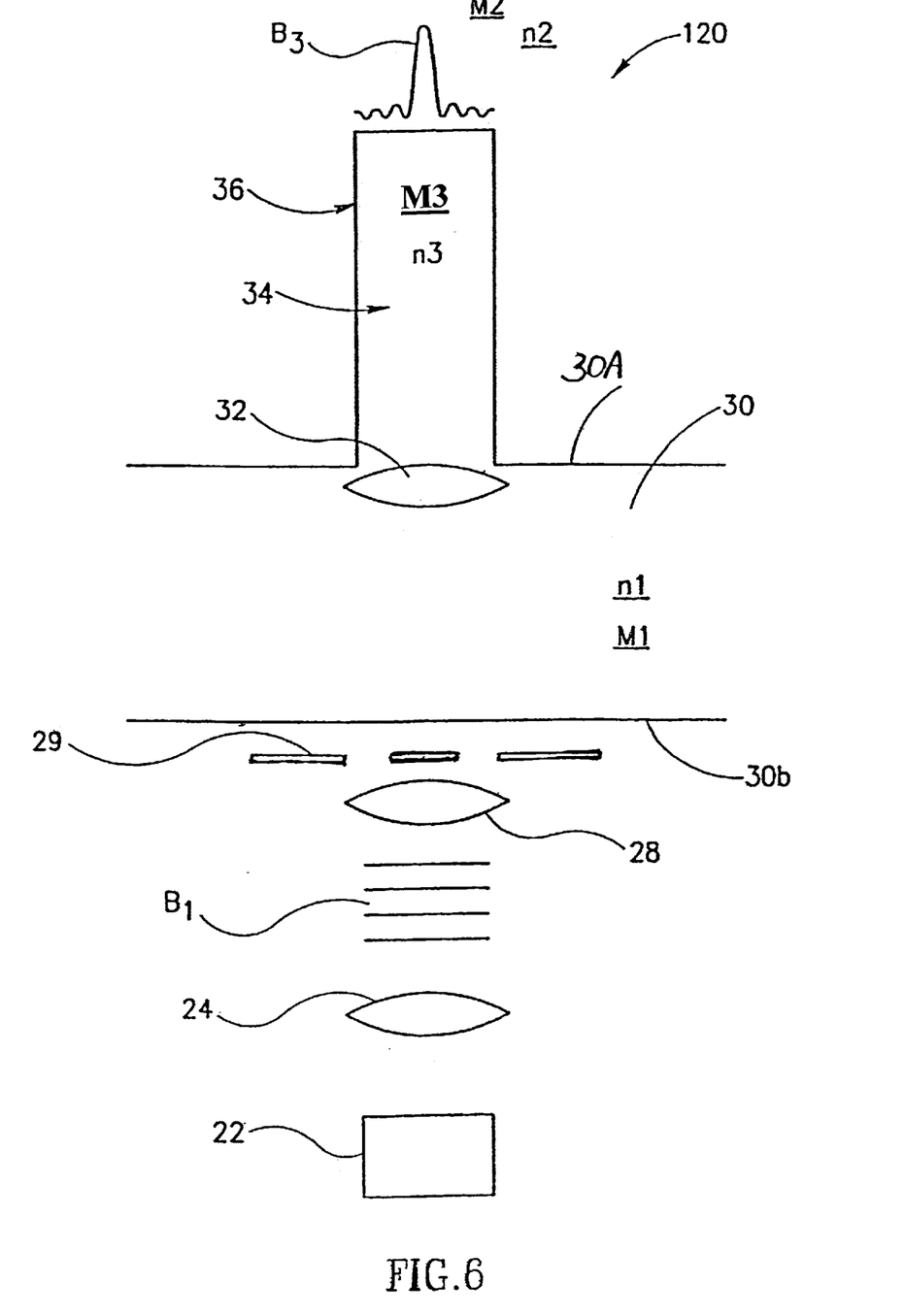
FIG. 6 illustrates the main components of a system according to another embodiment of the invention.

Reference is now made to FIG. 6 illustrating a system 120 constructed and operated according to another embodiment of the invention. Similarly, in order to facilitate understanding, those components which are common in the systems 20 and 120 are identified by the same reference numbers. Attached to the front surface 30a of the slab 30 is a cylinder 34 formed of a dielectric medium $M_3$ (constituting a third medium) having high refraction index $n_3$ as compared to the refraction index of the second medium $M_2$, such that:

$$n_3 \geq n_1 > n_2$$

The cylinder 34 is optionally covered by a conducting layer 36. The cylinder 34 represents a cylindrical waveguide that transports the ordinary Bessel beam (not shown) created at the interface 30b towards a target plane (not shown) accommodated in the second medium $M_2$ with the refraction $n_2$. At the exit of this waveguide, the field is converted into an evanescent type in a manner described above in respect of the system 20. Indeed, it is known that the Bessel vectorial solution presented in the above equations (8)–(9) are also the modes of metallic cylindrical waveguides that can be either hollow or filled by a dielectric. The condition for the above is that the tangential part of the electric field cancels at the inner boundary of the cylinder. This means that the metalized cylindrical waveguide 34 can serve as a duct for the "ordinary" Bessel beams. This exemplifies additional flexibility to the embodiment of FIG. 3 since it separates between the creation of the ordinary Bessel beam and its delivery in the form of EBB.

A central property of the Bessel solutions of the wave equation consists in fact that they are not square integrable in the transverse direction, and carry, therefore, an infinite amount of power. The multiplication of Bessels' function at an entrance plane by a suitable apodization function having a fast enough decaying character away from the propagating axis, provides a way to make the beam physically realizable. It is known that ordinary (non-evanescent) apodized Bessel beams substantially retain their shape at the central part for a finite propagation distance. Most applications suggested for Bessel beams were based on this fact. The following description demonstrates that this property is also maintained in the evanescent extension and provides axial decay rate calculations in comparison to the solution generated by the ordinary apertures. In order to facilitate understanding, a single component of the vectorial field will be considered (i.e. the component $E_2$ of the TM beams). assuming that conclusions will carry on qualitatively to the other components.

Short propagation distances involved in the systems of the kind specified, and the fact that the angular spectrum of an electromagnetic field contains both the propagating and evanescent components, excludes the possibility of performing any approximation of paraxial nature, and requires an exact solution of the wave equation governing the propagation of the field component under consideration. For a field of axial symmetry, the relevant component of the field is denoted by: $U(\rho,z)$ where $\rho$ is the radial distance from the axis and z is a the propagation distance. The propagation is defined by the equations:

$$U(\rho, z) = \int_0^{\gamma \max} y f(y) J_0(\rho y) e^{-iz\sqrt{(k^2-y^2)}} \, dy \quad (18)$$

$$f(y) = \int_0^{\rho \max} \rho U(\rho, 0) J_0(\rho y) d\rho \quad (19)$$

The argument y in a Hankel transform of the above equation, is related to an azimuthal spectral angle $\theta$ by the following relationship:

$$y = k \sin \theta \quad (20)$$

The use of y instead of $\theta$ has an advantage of extending the angular spectrum into the evanescent range y>k, keeping the integration variable real in the above equations (19)–(20).

Analogous to the propagating case, the lateral expansion of the beam while propagating will be compared to that of a reference beam created by a single aperture of dimensions close to that of the central lobe of the apodized Bessel beam under consideration. Fortunately, for two common apodization functions, namely the circular (step) and Gaussian, analytical expressions can be extracted from the equation (21) for the spectral function f(y). The expressions for two apodizing functions, Gaussian and Circular, and corresponding Hankel transforms are as follows:

Gaussian Apodization $$U(\rho, 0) = e^{\frac{\rho^2}{w^2}} J_0(\alpha \rho) \quad (21)$$

$$f(y) = \frac{w^2}{2} I_0\left(\frac{\alpha w^2}{2} y\right) e^{-\frac{w^2}{4}(\alpha^2+y^2)}$$

Circular Apodization $$U(\rho, 0) = J_0(\alpha \rho)\eta(a-p) \quad (22)$$

$$f(y) = \frac{a}{\alpha^2 - y^2}(\alpha J_0(ya)J_1(\alpha a) - y J_0(\alpha a)J_1(ya))$$

Here $\eta(\alpha-\rho)$ symbolizes the displaced step function. The cases of pure Gaussian and circular beams at the entrance planes can be deduced from the last expressions by setting that $\alpha=0$.

Figure 7A:
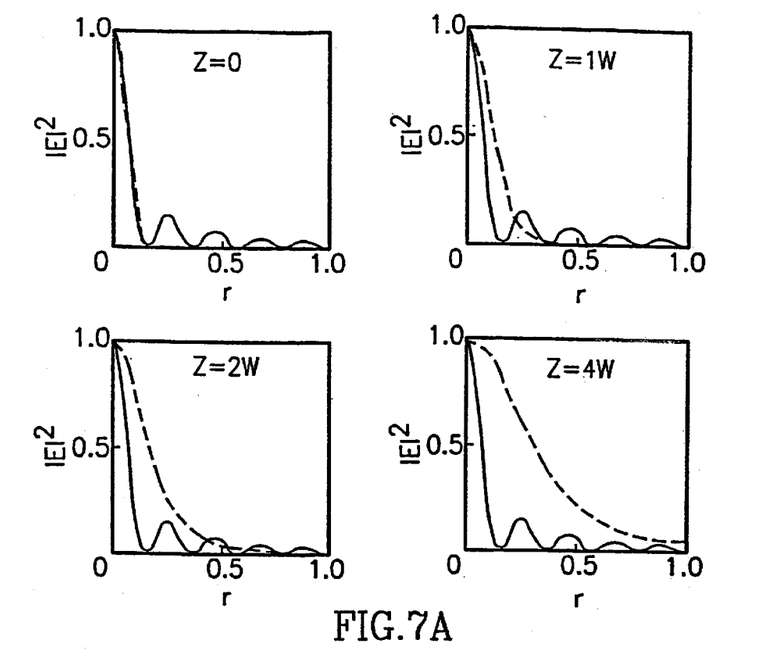
FIGS. 7a and 7b are graphic illustrations of the intensity distributions of propagating Gauss-Bessel evanescent beams in comparison to pure Gaussian and circular beams, respectively, at different distances from light emitting means.
Figure 7B:
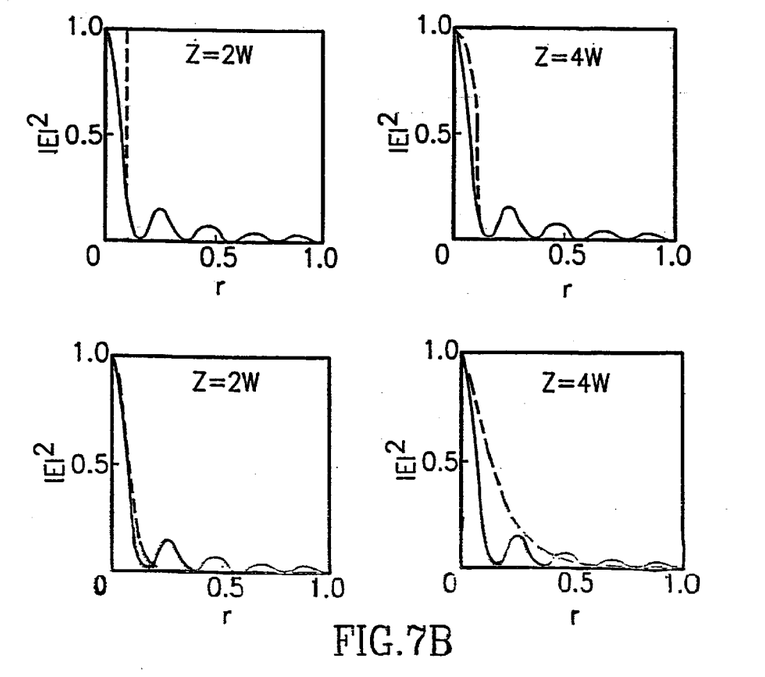

Turning now to FIGS. 7a and 7b, the propagations of the EBBs multiplied by the above defined apodization functions are displayed. More specifically, FIG. 7a illustrates the propagation of the Gauss Bessel evanescent beam (solid line) compared to the pure Gaussian beam (at z=0), while FIG. 7b illustrates the propagation of the Gauss Bessel evanescent beam (solid line) compared to the initially circular beam. The parameters of the Gauss Bessel evanescent beams in both examples are as follows:

$\alpha=1.5$ $w=1.5$

The initially pure Gaussian beam has w=0.12. The circular beam initial radius is b=0.12. In both cases, these so-called "single-spot-type" have width sizes close to that of the main lobe of a corresponding Bessel beam.

Figure 8:
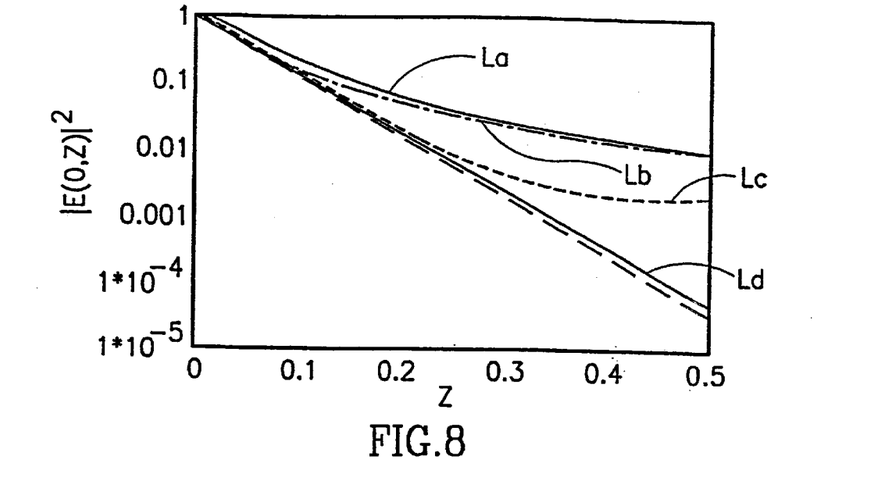
FIG. 8 is a graphic illustration of the power density distributions at the optical axis for circular, Gaussian and Bessel-circular types of beams.

FIG. 8 illustrates the decay of a power density at the optical axis for beams of different shape types. Lines $La$, $L_b$, $L_c$, $L_d$ correspond, respectively, to circular, Gaussian, Bessel-circular and Bessel-Gaussian decay types of beams having the same parameters as those of FIGS. 7a and 7b.

Hence, the following main properties are detected:
1) The initial shapes are basically preserved along with propagation for apodized EBBs. Furthermore, distortion effects familiar to the "ordinary" (non-evanescent) counterparts that appear initially at the outer parts of the profiles, are not present in these examples. This fact has its origin in the pure real character of the exponential in the propagator, as indicated in the above equations (19)–(20). In other words, for a beam having its angular spectrum well within the evanescent domain y>k, there are no interference beats between different spectral components:
2) The overall amplitude decay at propagation is very rapid, dominated by the following exponential:

$$\exp(-z\sqrt{(\alpha^2-k_0^2)})$$

which means for the above described examples a factor of $10^{-4}$ for a distance of approximately 4 times the width of the main lobe of the dominating Bessel function;
3) The comparison between the apodized EBBs with the beams transmitted by regular Gaussian or circular apertures (subwavelength "spots"), show a drastic advantage in favor of the apodized EBBs, in terms of enlargement of the main lobe. Thus the advantages of the new type of beams in terms of resolving power is clearly demonstrated;

4) In the above examples, the total size of a window of the apodized EBBs is rather small ($\omega \approx 1.5\lambda$) and, on the contrary to the propagating case, there is no advantage in enlarging it, as long as the Hankel spectrum of the beam remains well within the evanescent region;

5) The large reduction in power with a longitudinal distance actually means that there is no waste of power., since in the case of ideal evanescent waves the average Poynting vector is zero. A possible implementation scheme that uses this fact would place the interface plane (where nearly total internal reflection is taking place) as the end reflector of a suitable optical Fabri-Perot or laser cavity. In other words, the high power necessary for obtaining a sizable power at the target plane, can be accumulated inside the cavity.

Another kind of the EBBs, so-called "critical Bessel beams" (CBBs), constitute a transition between the propagating beams and EBBs. CBBs fulfill the following conditions:

$$\alpha = k$$
$$\beta = o$$

Vectorial versions of the beams according to Eqs. (8) and (9) acquire the following forms:

TM beam (23)
$$E_r = 0$$
$$E_\phi = 0$$
$$E_z = kJ_0(kr)$$
$$H_r = 0$$
$$H_\phi = i\varepsilon \frac{\omega}{c} J_1(kr)$$
$$H_z = 0$$

TE beam (24)
$$E_r = 0$$
$$E_\psi = -J_1(kr)$$
$$E_r = 0$$
$$H_r = 0$$
$$H_\phi = 0$$
$$H_T = -i\frac{\sqrt{\varepsilon}}{\mu} J_0(kr)$$

Each of these quite peculiar solutions of Maxwel's equations has a single magnetic and electric component, and are completely independent of the axial coordinate z. These solutions represent the Bessel beams with the narrowest lobes that do not decay with axial distance. Physically realizable apodized versions of these beams can be generated by the same methods as the evanescent types, namely by either suitable apertures or an 'ordinary' (non-evanescent) Bessel beam of the propagating type incident on a dielectric interface. In the last case, the critical condition for the incident beam, according to the above equation (13) turns to be as follows:

$$[\beta_j^2]_{er} = (n_1 - n_2)\frac{\omega_0^2}{c^2} \qquad (25)$$

These Bessel beams have a FWHM equal to $0.36\lambda$. When approximate beams related to these beams are considered, which beams are physically realizable by limiting them by an apodizing function, the axial coordinate invariance is no longer preserved. Unlike the case of pure evanescent components in the beam, here the size of the apodizing window does affect significantly the propagating behavior of the beam.

Figure 9A:
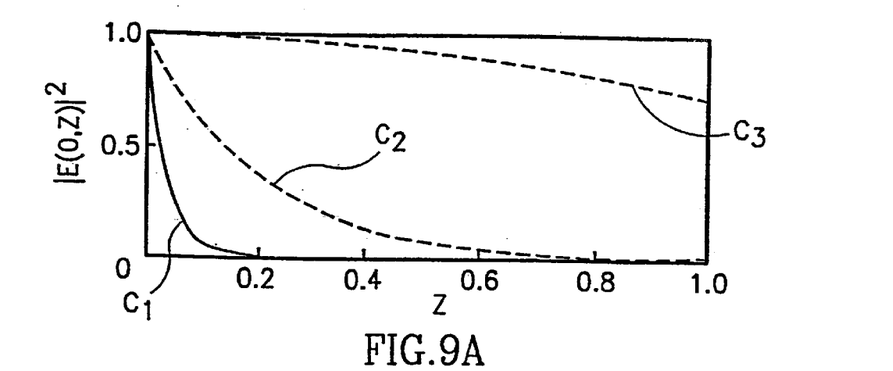
FIGS. 9a and 9b illustrate the power density distributions at the optical axis for purely evanescent, critical and purely propagating Bessel beams.
Figure 9B:
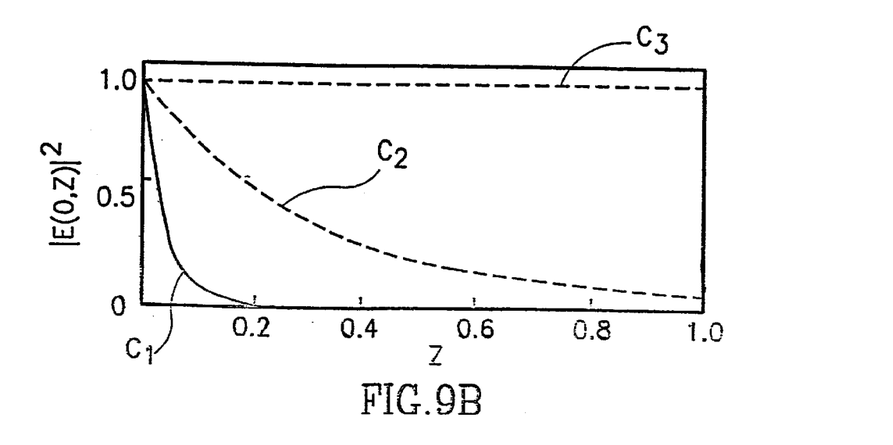

FIGS. 9a and 9b illustrate the decay of a power density at the optical axis for Bessel-Gaus beams of different types. Lines $C_1$, $C_2$ and $C_3$ correspond, respectively, to the purely evanescent, critical and purely propagating beams. In the example of FIG. 9a, the beams parameters are as follows:

$$(\alpha_0, \omega_0, k_0) = (15, 1.5, 2\pi), (15, 1.5, 15), (15, 1.5, 30) \qquad (26)$$

and in the example of FIG. 9b:

$$(\alpha_0, \omega_0, k_0) = (15, 0.75, 2\pi), (2\pi, 1.5, 2\pi), (1, 5, 2, \pi) \qquad (27)$$

The case of the purely propagating beam is much dependent on the relationship between the Gaussian and Bessel parameters w and $\alpha_i$ respectively. From the graphic illustration of FIGS. 9a and 9b, it is apparent that the axial intensity decays also in the case of the critical beams. This behavior can be understood when considering the angular spectrum of the critical case. This spectrum lies partly in the evanescent regime (y>k) and partly in the propagating region (y<k). Evanescent components decay rapidly as expected while the propagating components expand rapidly away from the axis at these tight apertures.

Figure 10:
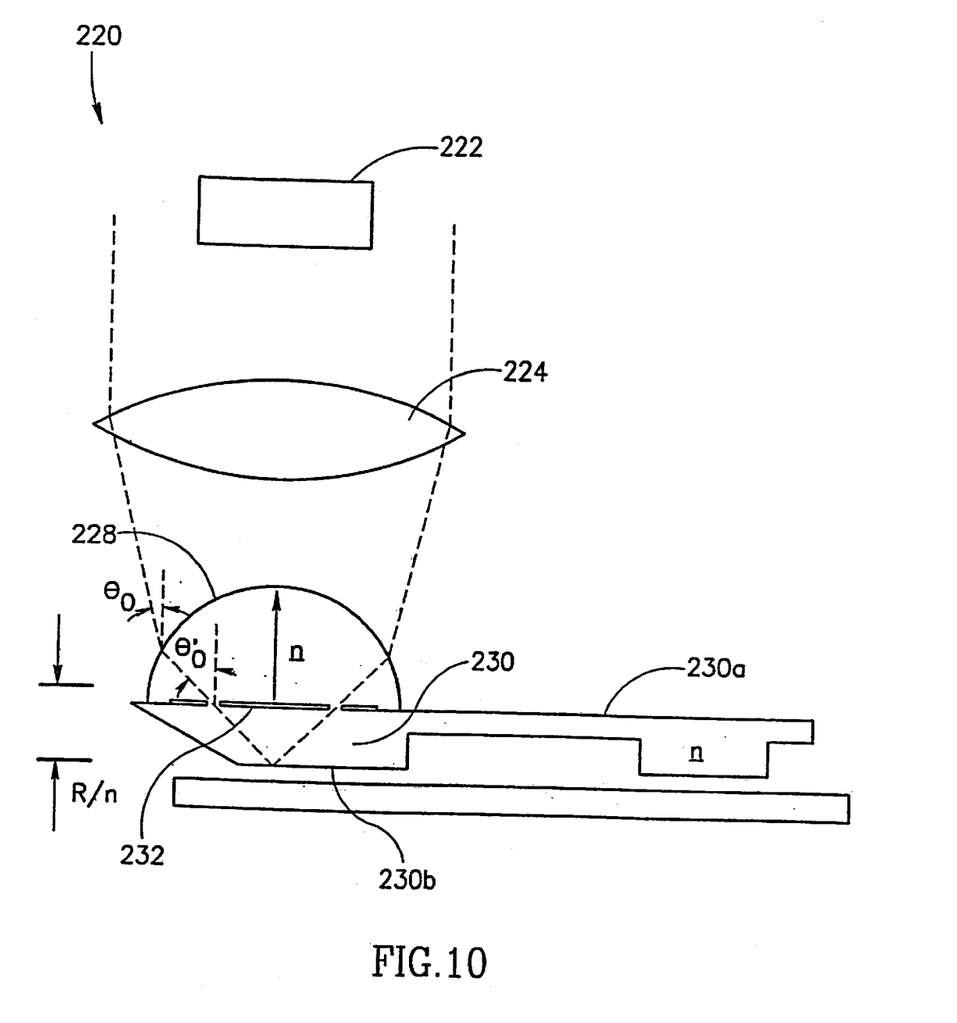
FIG. 10 is a schematic illustration of the main components of a system according to yet another embodiment of the invention.

In order to more brightly demonstrate the advantages of the present invention, yet another example of a system, generally designated 220, will now be described with reference to FIG. 10. The construction of the system 220 is generally similar to that of the system disclosed in the above U.S. Pat. No. 5,497,359. The system 220 typically comprises a light source 222 for emitting a collimated light beam of a plane wave, and an appropriate optics 224 for focusing the emitted beam and directing thereof into a second converging lens 228. Attached to the lens 228 is an air-bearing slab 230 having an upper surface 230a and a thickness of R/n, where R is the radius of the spherical lens 228, n is the refraction index of both the lens 228 and slab 230. If the converging lens 228 is designed so as to have a focal length in air of Rn, this arrangement produces a focal point at a lower surface 230b of the slab 230. The wavelength inside the elements 228 and 230 is reduced by a factor of n, and the focal spot size at the target plane (not shown) is reduced correspondingly. Spot sizes of less than $\lambda$ (air) are thus provided.

The system 220, in distinction to that disclosed in U.S. Pat. No. 5,497,359, additionally comprises an annular mask 232 located a interface between the spherical lens 228 and slab 230. Therefore, this arrangement is capable of generating a Bessel-like type of beam.

Using data disclosed in the above patent, we have:
the laser wavelength in air is $\lambda_0 = 830$ nm
n=1.83
numerical aperture of the converging lens 224 is NA=sin $(\theta_0)$=0.5 and, therefore $\theta_0$=30.
After passing the spherical lens 228, the converging angle is increased by:

$$\theta_0' = r \sin \theta n$$
$$\theta_0 = 66°$$

and $$\tan \theta_0 = \alpha/\beta = 2.27$$

where $\alpha$ and $\beta$ are parameters defining the evanescent Bessel beam fulfilling the following condition:

$$\alpha^2 + \beta^2 = (k_0 \cdot n_0)^2$$

Therefore: $\alpha=12.7^{\mu-1}$ and the FWHM of the main lobe gives:

$2.27/\alpha=0.178\ \mu m$ $\rho=2.27/\alpha=0.178\ \mu m$

The system without the annular aperture 232, according to the calculations provided in the patent disclosure, enables to obtain spots of about 0.31–0.36 μm. It is thus evident that the spot's diameter is reduced in the system 220 by at least a factor of 0.6 and the pixel density is increased by $1/(0.6)^2=2.78$. It is thus evident that the evanescent Bessel beam obtained in accordance with the principles of the present invention has a center lobe significantly smaller in size (0.178 μm) than the wavelength of radiation in the second medium ($\lambda$=830 nm) and basically retains its shape in the second medium. Furthermore, the beam generated without the annular mask will suffer from rapid expansion of the spot-size.

On the contrary, by means of generating EBBs a distance between the interface and the object to be scanned can be increased without loosing the resolution of the scanning system.

Those skilled in the art will readily appreciate that various modifications and changes may be applied to the invention as hereinbefore exemplified without departing from its scope defined in and by the appended claims.

What is claimed is:

1. A method for generating a radiation pattern in a target plane located in a near-field region of a radiation emitting system and at a desired distance from said radiation emitting system, the method comprising the steps of:
   a) emitting a beam of radiation;
   b) producing from said emitted beam of radiation a propagating radiation pattern propagating through a first medium of a refraction index $n_1$;
   c) directing the propagating radiation pattern from said first medium onto said target plane located in a second medium having a refraction index $n_2$, where $n_2<n_1$, said radiation having a wave number k defined by $2\pi/\lambda$ where $\lambda$ is the wavelength of said radiation in said second medium, wherein said propagating radiation pattern is produced in such a manner that substantially all spatial frequency components y of a resulting field of said propagating radiation pattern are greater than said wave number k such that said propagating radiation pattern generates a focused evanescent radiation pattern at said target plate with substantially zero propagating components within said second medium.

2. The method according to claim 1, wherein said propagating radiation pattern is substantially a normal Bessel beam produced by placing a circular annular source of the beam in a focal plane of a focusing optics.

3. The method according to claim 2, wherein said circular annular source is in the form of a circular slit.

4. The method according to claim 2, wherein said circular annular source is in the form of a mask.

5. The method according to claim 1, wherein the first medium comprises a lens arrangement, a circular annular source accommodated proximate the lens arrangement, and a slab extending in a direction of propagation of the beam of radiation towards the target plane a front surface of the slab being located in a focal plane of said lens arrangement and representing an interface between the first and second media.

6. The method according to claim 5, wherein the circular annular source is attached to a rear surface of the slab.

7. The method according to claim 5, wherein the lens arrangement comprises a solid immersion lens, the slab being attached to a front surface of the lens, while the circular annular source being located inside the lens.

8. The method according to claim 1, and also comprising a third medium located contiguous to said first medium downstream thereof relative to a direction of propagation of the beam of radiation towards said target plane located in the second medium, the third medium having a refraction index $n_3$ such that $n_3 \geq n_1 > n_2$.

9. The method according to claim 8, wherein the first medium comprises a lens arrangement, a circular annular source accommodated proximate the lens arrangement, and a slab extending in a direction of propagation of the beam of radiation towards the target plane; said third medium is in the form of a cylindrical waveguide attached to a front surface of said slab, a front surface of the cylindrical waveguide representing the interface between the third and second mediums, the passage of the propagating radiation pattern produced in the first medium through said interface generating said evanescent radiation pattern at the target plane located in the second medium.

10. The method according to claim 9, wherein the lens arrangement comprises a solid immersion lens, the slab being attached to a front surface of the lens, while the circular annular source being located inside the lens.

11. A system for generating a radiation pattern in a target plane, the system comprising: (a) an illumination arrangement for emitting a beam of radiation; (b) an optical arrangement accommodated in an optical path of said beam; (c) a first optical medium of refraction index $n_1$ deployed in said optical path; and (d) a second optical medium of refraction index $n_2$ deployed in said optical path, where $n_2<n_1$, the target plane being located within said second optical medium, wherein said illumination arrangement is configured to emit radiation having a wave number A defined by $2\pi/\lambda$ where is the wavelength of said radiation in said second medium, wherein said optical arrangement is configured for producing from said beam a propagating radiation pattern propagating in said first optical medium and incident on an interface between said first optical medium and said second optical medium, said optical arrangement being configured to generate said propagating radiation pattern in such a manner that substantially all spatial frequency components y of a resulting field of said propagating radiation pattern are greater than said wave number k such that said propagating radiation pattern generates a focused evanescent radiation pattern at said target plane with substantially zero propagating components within said second medium.

12. The system according to claim 11, wherein the optical arrangement includes means for producing a normal Bessel beam.

13. The system according to claim 12, wherein the means for producing the normal Bessel beam comprises a focusing optics and a circular annular source of the beam placed in a focal plane of said focusing optics.

14. The system according to claim 13, wherein said circular annular source is in the form of a circular slit.

15. The method according to claim 13, wherein said circular annular source is in the form of a mask.

16. The system according to claim 11, wherein said optical arrangement comprises a lens arrangement, a circular annular source accommodated proximate the lens arrangement and a slab extending in a direction of propagation of the beam of radiation towards the target plane, a front surface of the slab being located in a focal plane of said lens arrangement, and representing an interface between the first and second mediums.

17. The system according to claim 16, wherein the circular annular source is attached to a rear surface of the slab.

18. The system according to claim 16, wherein the lens arrangement comprises a solid immersion lens, the slab being attached to a front surface of the lens, while the circular annular source being located inside the lens.

19. The system according to claim 11, and also comprising a third medium located contiguous to said first medium downstream thereof relative to a direction of propagation of the beam of radiation towards said target plane located in the second medium, the third medium having a refraction index $n_3$ such that $n_3 \geq n_1 > n_2$.

20. The system according to claim 19, wherein the first medium comprises a lens arrangement, a circular annular source accommodated proximate the lens arrangement, and a slab extending in a direction of propagation of the beam of radiation towards the target plane; said third medium is in the form of a cylindrical waveguide attached to a front surface of the slab, a front end of the cylindrical waveguide representing an interface between the first and second mediums, the passage of the propagating radiation pattern produced in the first medium through said interface generating said evanescent radiation pattern at the target plane located in the second medium.

21. The system according to claim 20, wherein the lens arrangement comprises a solid immersion lens, the slab being attached to a front surface of the lens, while the circular annular source being located inside the lens.

22. The system according to claim 11, and also comprising a beam converging arrangement for generating a wavefront of the generated beam propagating towards the target plane in the second medium.

* * * * *